US007346187B2

(12) United States Patent
Buehler

(10) Patent No.: US 7,346,187 B2
(45) Date of Patent: Mar. 18, 2008

(54) METHOD OF COUNTING OBJECTS IN A MONITORED ENVIRONMENT AND APPARATUS FOR THE SAME

(75) Inventor: Christopher J. Buehler, Cambridge, MA (US)

(73) Assignee: IntelliVid Corporation, Cambridge, MA (US)

( * ) Notice: Subject to any disclaimer, the term of this patent is extended or adjusted under 35 U.S.C. 154(b) by 805 days.

(21) Appl. No.: 10/683,483

(22) Filed: Oct. 10, 2003

(65) Prior Publication Data

US 2005/0078852 A1    Apr. 14, 2005

(51) Int. Cl.
   *H04N 7/18*   (2006.01)
(52) U.S. Cl. ...................... 382/103; 348/143
(58) Field of Classification Search ............. 382/291; 348/135, 169
   See application file for complete search history.

(56) References Cited

U.S. PATENT DOCUMENTS

| | | | |
|---|---|---|---|
| 3,740,466 A | 6/1973 | Marshall et al. ............ 178/6.8 |
| 4,511,886 A | 4/1985 | Rodriguez .................. 340/534 |
| 4,737,847 A | 4/1988 | Araki et al. ................ 358/108 |
| 5,097,328 A | 3/1992 | Boyette ...................... 358/108 |
| 5,164,827 A | 11/1992 | Paff ........................... 358/108 |
| 5,179,441 A | 1/1993 | Anderson et al. ............ 358/88 |
| 5,216,502 A | 6/1993 | Katz .......................... 358/108 |
| 5,237,408 A | 8/1993 | Blum et al. ................. 358/108 |
| 5,243,418 A | 9/1993 | Kuno et al. ................. 358/108 |
| 5,298,697 A * | 3/1994 | Suzuki et al. ............... 187/392 |
| 5,305,390 A | 4/1994 | Frey et al. .................... 382/2 |
| 5,317,394 A | 5/1994 | Hale et al. .................. 348/208 |
| 5,581,625 A | 12/1996 | Connell ........................ 382/1 |
| 5,666,157 A | 9/1997 | Aviv .......................... 348/152 |
| 5,699,444 A | 12/1997 | Palm ......................... 382/106 |
| 5,729,471 A | 3/1998 | Jain et al. ................... 364/514 |
| 5,734,737 A | 3/1998 | Chang et al. ............... 382/107 |
| 5,745,126 A | 4/1998 | Jain et al. ................... 345/952 |
| 5,920,338 A | 7/1999 | Katz .......................... 348/150 |
| 5,956,081 A | 9/1999 | Katz et al. .................. 348/163 |
| 5,969,755 A | 10/1999 | Courtney .................... 348/143 |
| 5,973,732 A | 10/1999 | Guthrie ....................... 348/169 |
| 6,002,995 A | 12/1999 | Suzuki et al. ............... 702/188 |

(Continued)

FOREIGN PATENT DOCUMENTS

EP      0 529 317 A1      3/1993

(Continued)

OTHER PUBLICATIONS

International Preliminary Report on Patentability for PCT/US2004/029417 dated Mar. 13, 2006.

(Continued)

*Primary Examiner*—Jingge Wu
*Assistant Examiner*—Jayesh A Patel
(74) *Attorney, Agent, or Firm*—Goodwin Procter LLP

(57) ABSTRACT

Methods and system for determining, a number of objects, without tracking each of the objects, in first and second fields-of-view. First and second video frames are received from first and second image sources. The image sources have the first and second fields-of-view, and the fields-of-view are known to overlap at least in part. The number of objects is determined based on the first and second video frames and the known overlap.

8 Claims, 17 Drawing Sheets

U.S. PATENT DOCUMENTS

| | | | |
|---|---|---|---|
| 6,028,626 A | 2/2000 | Aviv | 348/152 |
| 6,049,363 A | 4/2000 | Courtney et al. | 348/700 |
| 6,061,088 A | 5/2000 | Khosravi et al. | 348/169 |
| 6,069,655 A | 5/2000 | Seeley et al. | 348/154 |
| 6,075,560 A | 6/2000 | Katz | 348/150 |
| 6,097,429 A | 8/2000 | Seeley et al. | 348/154 |
| 6,185,314 B1 | 2/2001 | Crabtree et al. | 382/103 |
| 6,188,777 B1 | 2/2001 | Darrell et al. | 382/103 |
| 6,237,647 B1 | 5/2001 | Pong et al. | 141/94 |
| 6,285,746 B1 | 9/2001 | Duran et al. | 379/93.21 |
| 6,295,367 B1 | 9/2001 | Crabtree et al. | 382/103 |
| 6,359,647 B1 | 3/2002 | Sengupta et al. | 348/154 |
| 6,396,535 B1 | 5/2002 | Waters | 348/159 |
| 6,400,830 B1 | 6/2002 | Christian et al. | 382/103 |
| 6,400,831 B2 | 6/2002 | Lee et al. | 382/103 |
| 6,437,819 B1 | 8/2002 | Loveland | 348/143 |
| 6,442,476 B1 | 8/2002 | Poropat | 701/207 |
| 6,456,320 B2 | 9/2002 | Kuwano et al. | 348/143 |
| 6,456,730 B1 | 9/2002 | Taniguchi | 382/107 |
| 6,483,935 B1 | 11/2002 | Rostami et al. | 382/141 |
| 6,502,082 B1 | 12/2002 | Toyama et al. | 706/16 |
| 6,516,090 B1 | 2/2003 | Lennon et al. | 382/173 |
| 6,522,787 B1 | 2/2003 | Kumar et al. | 382/268 |
| 6,526,156 B1 | 2/2003 | Black et al. | 382/103 |
| 6,549,643 B1 | 4/2003 | Toklu et al. | 382/107 |
| 6,549,660 B1 | 4/2003 | Lipson et al. | 382/224 |
| 6,574,353 B1 | 6/2003 | Schoepflin et al. | 382/103 |
| 6,580,821 B1 | 6/2003 | Roy | 382/154 |
| 6,591,005 B1 | 7/2003 | Gallagher | 382/154 |
| 6,698,021 B1 | 2/2004 | Amini et al. | 725/105 |
| 6,791,603 B2 | 9/2004 | Lazo et al. | 348/169 |
| 6,798,445 B1 | 9/2004 | Brummitt et al. | 348/207.11 |
| 6,813,372 B2 | 11/2004 | Stanbridge et al. | 382/107 |
| 2001/0032118 A1 | 10/2001 | Carter | 705/11 |
| 2003/0025800 A1 | 2/2003 | Hunter et al. | 348/208.13 |
| 2003/0040815 A1 | 2/2003 | Pavlidis | 700/48 |
| 2003/0053658 A1 | 3/2003 | Pavlidis | 382/103 |
| 2003/0058111 A1 | 3/2003 | Lee et al. | 340/573.1 |
| 2003/0058237 A1 | 3/2003 | Lee | 345/418 |
| 2003/0058341 A1 | 3/2003 | Brodsky et al. | 348/169 |
| 2003/0058342 A1 | 3/2003 | Trajkovic | 348/207.1 |
| 2003/0071891 A1 | 4/2003 | Geng | 348/39 |
| 2003/0103139 A1 | 6/2003 | Pretzer et al. | 348/143 |
| 2003/0123703 A1 | 7/2003 | Pavlidis et al. | 382/103 |
| 2003/0197612 A1 | 10/2003 | Tanaka et al. | 340/572.1 |
| 2004/0130620 A1 | 7/2004 | Buehler et al. | 348/143 |
| 2004/0155960 A1 | 8/2004 | Wren et al. | 348/150 |
| 2004/0160317 A1 | 8/2004 | McKeown et al. | 340/522 |
| 2004/0164858 A1 | 8/2004 | Lin | 340/522 |
| 2004/0252197 A1 | 12/2004 | Fraley et al. | 348/207.1 |
| 2005/0017071 A1 | 1/2005 | Noonan | 235/385 |
| 2005/0073418 A1 | 4/2005 | Kelliher et al. | 340/572.1 |
| 2005/0078006 A1 | 4/2005 | Hutchins et al. | 340/561 |
| 2005/0102183 A1 | 5/2005 | Kelliher et al. | 705/16 |

FOREIGN PATENT DOCUMENTS

| | | |
|---|---|---|
| EP | 0 714 081 A1 | 5/1996 |
| EP | 0 967 584 A2 | 12/1999 |
| EP | 1189187 A2 | 3/2002 |
| JP | 8011071 | 1/1996 |
| WO | 97/04428 | 2/1997 |
| WO | 01/82626 A1 | 11/2001 |

OTHER PUBLICATIONS

International Preliminary Report on Patentability for PCT/US2004/033177 dated Apr. 10, 2006.

International Preliminary Report on Patentability for PCT/US2004/033168 dated Apr. 10, 2006.

Author unknown. "The Future of Security Systems" retreived from the internet on May 24, 2005, http://www.activeye.com/; http://www.activeye.com/act_alert.htm; http://www.activeye.com/tech.htm; http://www.activeye.com/ae_team.htm; 7 pgs.

International Search Report for PCT/US2004/033177 dated Dec. 12, 2005.

Written Opinion for PCT/US2004/033177.

International Search Report for PCT/US04/29417 dated Mar. 18, 2005.

Written Opinion of the International Searching Authority for PCT/US04/29417.

International Search Report for PCT/US04/033168 dated Feb. 25, 2005.

Written Opinion of the Internation Searching Authority for PCT/US04/033168 dated Feb. 25, 2005.

International Search Report for PCT/US04/29418 dated Feb. 28, 2005.

Written Opinion of the Internation Searching Authority for PCT/US04/29418 dated Feb. 25, 2005.

Chang et al., "Tracking Multiple People with a Multi-Camera System," *IEEE*, 19-26 (2001).

International Search Report for International Application No. PCT/US03/35943 dated Apr. 13, 2004.

Khan et al., "Human Tracking in Multiple Cameras," *IEEE*, 331-336 (2001).

* cited by examiner

500

| DFVOR 502 | Image Regions 504 | Object Average 510 | Count 507 | PROCESSED? 506 |
|---|---|---|---|---|
| 1 | A | 3 | 0 | 1 |
| 2 | B, A2 | 1.12 | 1 | 1 |
| 3 | C | 2.3 | 1 | 1 |
| 4 | Da | | | 0 |
| 5 | Db, C2a | | | 0 |
| 6 | Dc | | | 0 |
| 7 | Dd, C2c | | | 0 |
| 8 | B2 | 1.5 | | 0 |
| 9 | C2b | | | 0 |
| 10 | C2d | | | 0 |
| 11 | D2 | 1.5 | | 0 |

Fig. 11

METHOD OF COUNTING OBJECTS IN A MONITORED ENVIRONMENT AND APPARATUS FOR THE SAME

CROSS-REFERENCE TO RELATED APPLICATION

1. Technical Field

The present invention generally relates to video surveillance, and more specifically to a computer aided surveillance system for determining the numbers of objects included in a monitored environment.

2. Background

The current heightened sense of security and declining cost of camera equipment have resulted in increased use of closed circuit television (CCTV) surveillance systems. Such systems have the potential to reduce crime, prevent accidents, and generally increase security in a wide variety of environments.

A simple closed-circuit television system uses a single camera connected to a display device. More complex systems can have multiple cameras and/or multiple displays. One known type of system is the security display in a retail store, which switches periodically between different cameras to provide different views of the store. Higher security installations, such as prisons and military installations, use a bank of video displays each displaying the output of an associated camera. A guard or human attendant constantly watches the various screens looking for suspicious activity.

More recently, inexpensive digital cameras have become popular for security and other applications. In addition, it is now possible to use a web cam to monitor a remote location. Web cams typically have relatively slow frame rates, but are sufficient for some security applications. Inexpensive cameras that transmit signals wirelessly to remotely located computers or other displays are also used to provide video surveillance.

As the number of cameras increases, the amount of raw information that needs to be processed and analyzed also increases. Computer technology can be used to alleviate this raw data processing task, resulting in a new breed of information technology device—the computer-aided surveillance (CAS) system. Computer-aided surveillance technology has been developed for various applications. For example, the military has used computer-aided image processing to provide automated targeting and other assistance to fighter pilots and other personnel. In addition, computer-aided surveillance has been applied to monitor activity in swimming pools.

On a macroscopic level, a video surveillance frame depicts an image of a scene in which people and things move and interact. On a microscopic level, a video frame is composed of a plurality of pixels, often arranged in a grid-like fashion. The number of pixels in an image depends on several factors including the resolution of the camera generating the image, the display on which the image is presented, the capacity of the storage device on which the images are stored, etc. Analysis of a video frame can be conducted either at the pixel level or at the (pixel) group level depending on the processing capability and the desired level of precision. A pixel or group of pixels being analyzed is referred to herein as an "image region."

A given video frame can further be divided into a background and objects. In general, the background remains relatively static in each video frame. However, objects are depicted in different image regions in different frames. Several methods for separating objects in a video frame from the background of the frame, referred to as object extraction, are known in the art. A common approach is to use a technique called "background subtraction." Of course, other techniques can be used.

SUMMARY OF THE INVENTION

CAS systems can be used for purposes other than security. For example, CAS systems can help provide useful information to business operators. For example, business establishment operators often want to determine traffic patterns within their establishments. Firms are hired to manually count the number of people who travel into, through, and out of stores to determine prime traffic times and locations. Similarly, turnstiles detect traffic flow through stadiums, transportation depots, and other establishments. Human monitors are easily distracted and are limited by their own fields of view and limited vantage points. Turnstiles can be jumped and are difficult and costly to rearrange for changes in an environment.

Some tracking systems maintain an inherent count of objects that they track. Tracking systems, in general, aim to monitor the movement of specific objects as those objects move through a monitored environment. Tracking, while useful for some applications, may require significant processing power, and like human monitors, many tracking systems are overly limited by the fields-of-view of the cameras the systems employ or a lack of understanding of the environment that the cameras monitor. Many tracking systems also suffer from reduced performance when analyzing low frame rate video, which is used by many surveillance systems. In one embodiment, the present invention may overcome such problems, and others, by providing a CAS system that can provide statistically useful object counting information for a variety of monitored environments without requiring the CAS system to track any objects within the monitored environment.

In one aspect, the invention relates to a computerized method of video analysis that includes receiving first and second video frames generated by first and second image sources. The fields of view of the first and second video sources overlap at least in part. The method also includes determining a number of objects, without tracking each of the objects in the first and second fields-of-view based on the video frames.

In another aspect, the invention relates to computerized method of video analysis that includes receiving first and second pluralities of video frames from first and second image sources. Each plurality of video frames was generated over a period of time. The fields-of-view of the image sources overlap, at least in part. The method also includes determining a number of objects, without tracking each of the objects, in the first and second fields-of-view at one instant in time based on the video frames.

In yet another aspect, the invention relates to a computerized method of video analysis that includes receiving a video frame and subsequent video frame generated by an image source. The image source has a field-of-view in a monitored environment that includes off-camera regions and an environment gateway. The method includes determining a number of objects, without tracking each of the objects, included in the off-camera regions. In one embodiment, the method also includes determining a number of objects in the monitored environment. In another embodiment, the method also includes receiving a second video frame and a subsequent video frame. The second video frames are generated by a second image source having a second field-of-view in the monitored environment.

In a further aspect, the invention relates to a system for video analysis that includes a receiving module configured to receive first and second video frames generated by first and second image sources. The fields of view of the first and second video sources overlap at least in part. The system also includes a processing module configured to determine a number of objects, without tracking each of the objects, in the first and second fields-of-view based on the video frames.

In another aspect the invention relates to a system that includes a receiving module configured to receive first and second pluralities of video frames from first and second image sources. Each plurality of video frames was generated over a period of time. The fields-of-view of the image sources overlap, at least in part. The method also includes determining a number of objects, without tracking each of the objects, in the first and second fields-of-view at one instant in time based on the video frames.

In yet another aspect, the invention relates to a system for video analysis that includes a receiving module configured to receive a video frame and subsequent video frame generated by an image source. The image source has a field-of-view in a monitored environment that includes off-camera regions and an environment gateway. The system also includes a processing module configured to determine a number of objects, without tracking each of the objects, included in the off-camera regions. In one embodiment, the processing module is further configured to determine a number of objects in the monitored environment. In another embodiment, the receiving module is configured to receive a second video frame and a subsequent video frame. The second video frames are generated by a second image source having a second field-of-view in the monitored environment.

BRIEF DESCRIPTION OF THE DRAWINGS

The foregoing discussion will be understood more readily from the following detailed description of the invention, when taken in conjunction with the accompanying drawings.

FIG. 11 is a schematic depiction of the contents of a Distinct field-of-view data structure after subdivision of an analysis image region.

DETAILED DESCRIPTION

In a surveillance system, cameras capture image data that depicts the interaction of people and things in a monitored environment. Types of cameras include analog video cameras, digital video cameras, or any device that can generate image data. The word "camera," is used as a generic term that encompasses any sensor that can output video data. In one embodiment, the CAS system observes a monitored environment through a number of input sensors although its primary sources of information are video cameras. The majority of CCTV installations use common visible-light video cameras. In such installations, the CAS system employs advanced video analysis algorithms for the extraction of information from analog NTSC or PAL video. These algorithms, however, are not limited to the visible light spectrum; they can also be applied to infrared video or even imagery from radar or sonar installations if available.

Figure 1:
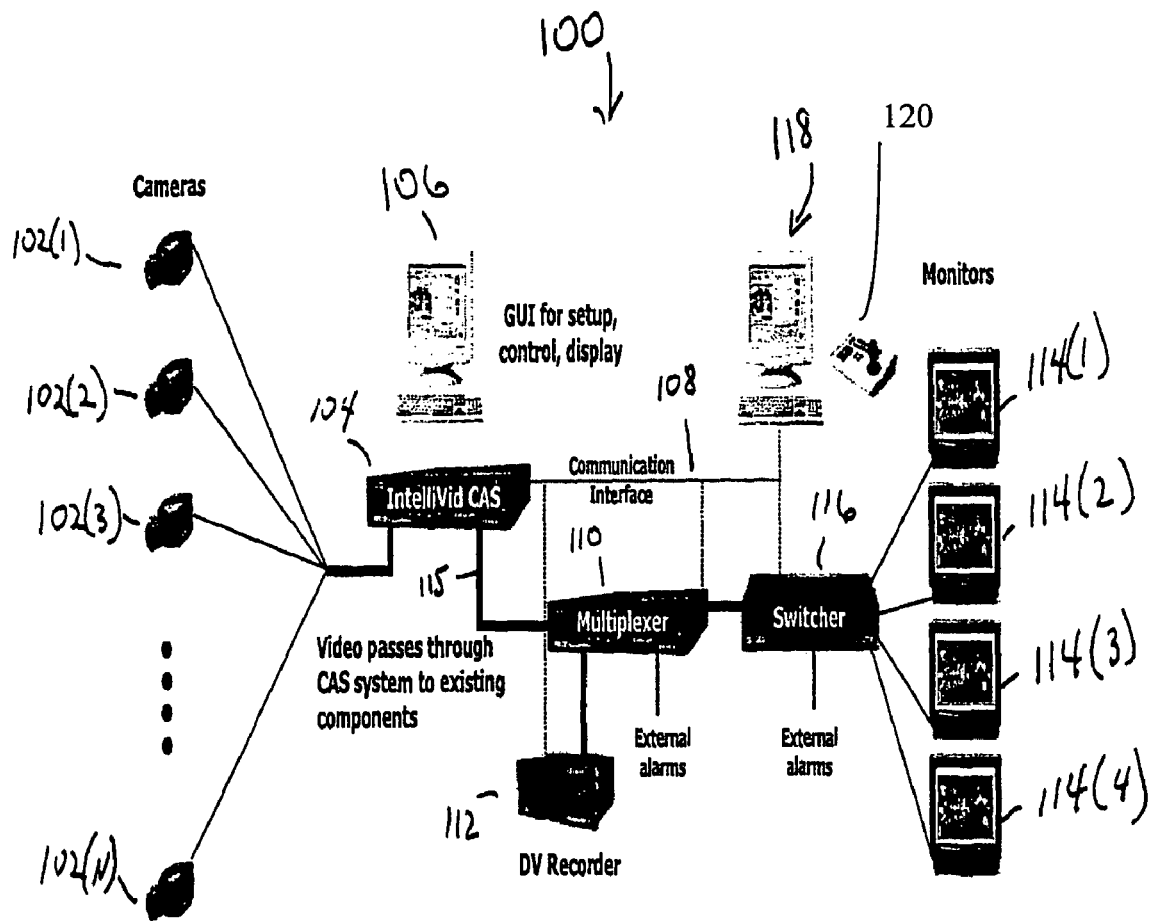
FIG. 1 is a block diagram of an illustrative overall computer-assisted surveillance ("CAS") system utilizing one aspect of the invention.

FIG. 1 shows an illustrative computer-assisted surveillance ("CAS") system 100. A plurality of cameras or other image input devices 102 provide image inputs to a computer 104 programmed to provide image analysis. CAS computer 104 can include a display 106 providing a graphical user interface for setup, control and display. CAS computer 104 can also include one or more user input devices (not shown) such as keyboards, mice, etc. to allow users to input control signals.

CAS computer 104 performs advanced image processing including image feature extraction and object counting. CAS computer 104 can automatically detect objects and activity and can generate warning and other information that can be transmitted over a digital communications network or other interface 108. CAS computer 104 also uses interface 108 to retrieve data, such as previously recorded video stored on recorder 112 or information stored on other computers. CAS computer 104 provides the outputs of the various cameras 102 to a multiplexer 110 for recording, typically continuous or stop-frame, by recorder 112 and for display on one or more displays 114 via a switcher 116. An additional user interface (e.g., provided by another computer 118 and user input including, for example, a joystick 120) can be used to allow an operator to control switcher 116 to select images to view and to control other parts of system 100 including CAS computer 104. Multiplexer 110 and/or switcher 116 can respond to external alarms that occur when certain types of activity have been automatically detected (e.g., an alarm generated by a motion sensor) and record or display video appropriately. These alarms can also be generated by CAS computer 104 based on detected activities in the video streams.

The illustrative CAS Computer 104 system integrates seamlessly into any existing security infrastructure. The illustrative embodiment CAS system 100 is compatible with, for example, legacy analog video sources, in addition to newer digital video sources such as USB, FireWire, or IP cameras on wired or wireless networks. The CAS computer 104 acts as a passive repeater of its input signals, so that in the unlikely event of a CAS computer 104 failure, the remainder of the security infrastructure continues to function without the CAS computer 104.

While video cameras 102 are the typical primary sensors for the CAS system 100, the system can also accommodate other commonly-used sensors, such as motion detectors, smoke detectors, spill detectors, microphones, point-of-sale (POS) recordings, electronic article surveillance (EAS) systems, and access control systems. The illustrative CAS system 100 combines information from these sensors with the video analysis results to provide an even richer description of activities in the world. For example, POS information may be used with video images to verify that a customer purchased a particular product.

Figure 2:
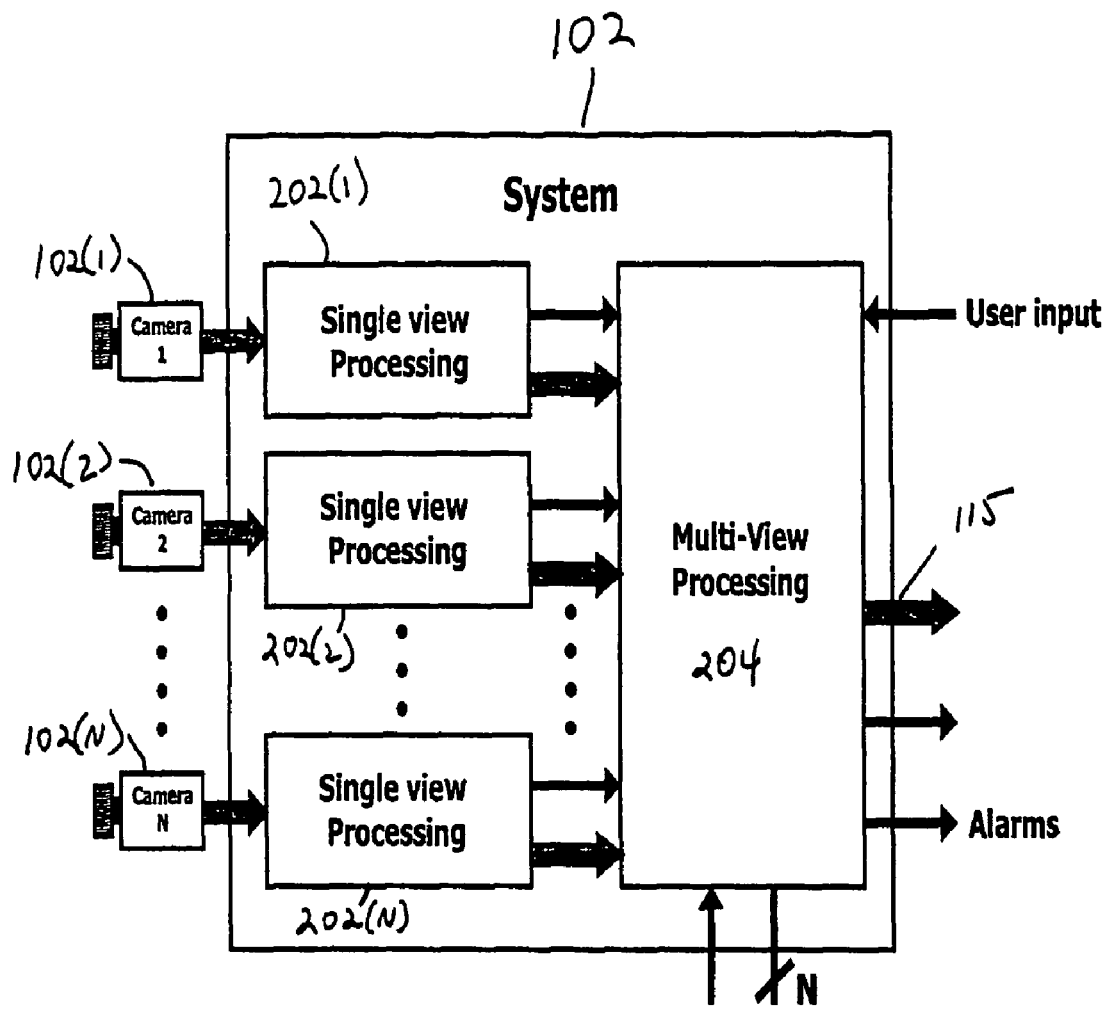
FIG. 2 is a high-level block diagram of an illustrative CAS computer according to one embodiment of the invention.

FIG. 2 shows a high-level block diagram of an illustrative CAS computer 104. For illustrative purposes, the computer components are grouped into two main classes: single-view processing blocks 202 (SVPs) and multi-view processing blocks 204 (MVPs). Each image input source is attached to a SVP 202. Image input sources include cameras 102 as well as a variety of storage devices including, for example, computer disks, VHS tapes, and digital videotapes. For purposes of data analysis, image data outputted by a video storage device is the equivalent of image data generated by a camera. Each SVP 202 typically performs video processing tasks that require only a single video stream. The outputs of the SVP 202 are connected to a MVP 204 that processes multiple video streams at once. Depending on the embodiment, a processing module includes a MVP 204, or a combination of one or more SVPs 202 and one or more MVPs 204. The CAS computer also includes memory modules (not shown) for receiving and storing incoming image data. The memory modules can be a part of the processing modules, or they can be separate from the processing modules.

The single-view processing components 202 and the multi-view processing components 204 typically analyze data as a series of video frames depicting a scene. In one embodiment, image data is analyzed directly from a camera. In another embodiment, the analyzed image data can originate from a storage device. The image data originating from the storage device could have been generated by cameras directly connected to the CAS system 100. In addition, the CAS computer can analyze image data generated by remote cameras. For example, the CAS system could provide forensic analysis of third party surveillance tapes.

Some cameras and video storage devices create and store image data on a frame-by-frame basis. Other storage systems may only store video frame updates, i.e. detected changes to the scene. To carry out analysis of image data, the CAS computer 104 constructs a video frame from image data that may be stored in a variety of devices and formats.

A video frame is composed of a plurality of pixels. The number of pixels in a video frame typically depends on, among other factors, the resolution of the camera generating the video frame, the display on which the video frame is presented, and the capacity of the storage device on which the video frames are stored. Analysis of a video frame can be conducted either at the pixel level or by analyzing groups of pixels depending on the processing power available and the level of precision desired. A pixel or group of pixels to be analyzed is referred to herein as an "image region."

Image regions can be categorized as constituent image regions or analysis image regions. Constituent image regions are the smallest group of pixels (in some cases a single pixel) for which information is maintained within a CAS computer 104 for a given variable. To reduce the processing requirements, the CAS computer 104 can group one or more constituent image regions into analysis image regions. The CAS computer 104 then operates on the analysis image regions.

Figure 3:
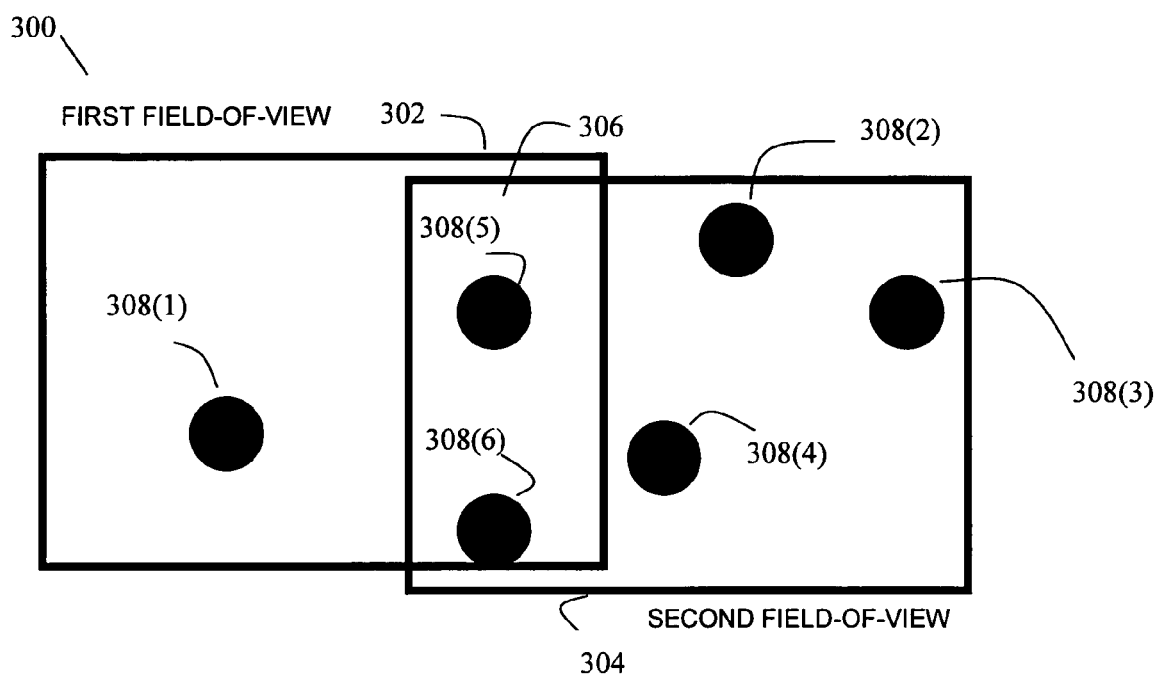
FIG. 3 is a schematic depiction of an illustrative monitored environment.

FIG. 3 is a schematic depiction of an illustrative monitored environment 300 (e.g., a retail store). Monitored environments are areas monitored by one or more cameras. The illustrated monitored environment 300 is surveyed by two cameras 102. The first camera 102(1) has a first field-of-view 302. The second camera 102(2) has a second field-of-view 304. A portion 306 of the first and second fields-of-view 302 and 304 overlap. That is, if an object were included in the monitored environment 300 within the overlapping portion 306, the object would be visible (barring any obstructions) in video frames generated by each camera 102(1) and 102(2).

The monitored environment 300 also includes a number of objects 308(1)-308(n) (collectively 308), wherein n is the total number of objects 308 within monitored environment 300. A first object 308(1) is included only within the first field-of-view 302. Second objects 308(2), 308(3), and 308(4) are included only within the second field-of-view 304. Joint objects 308(5) and 308(6) are included within both fields-of-view.

If a CAS computer 104 were to determine a total object count of the number of objects 308 included within the two fields-of-view 302 and 304 by determining the number of objects 308 included in each field-of-view 302 and 304 separately, and then adding those numbers together, the CAS computer 104 would count the joint objects 308(5) and 308(6) twice, thus resulting in frequently imprecise total object counts. Some embodiments of the invention may improve the precision of a total object count by taking into the consideration the fact that a single object 308 may appear in more than one field-of-view 302 and 304 at the same time.

Counting objects is not the same as counting people. An object is any group of pixels that the CAS computer determines is not part of the background. That is, an object can be, for example, a person, an animal, a moving inanimate object (e.g., a pushed grocery cart or rolling ball), etc. An object could also be several people gather together in such a fashion that, at least from a camera's perspective, the people overlap. Similarly, a single person may appear to a CAS computer as more than one object (e.g. if a person were observed standing behind a railing, a CAS computer might determine that the pixels above the railing constitute one object, and that the pixels below the railing constitute a second object. Determining whether one more objects correspond to one or more persons requires analysis that is beyond the scope of this invention, and which, for the purposes of the invention, is also unnecessary. Knowing a number of objects can be used to estimate a number of people.

Figure 4:
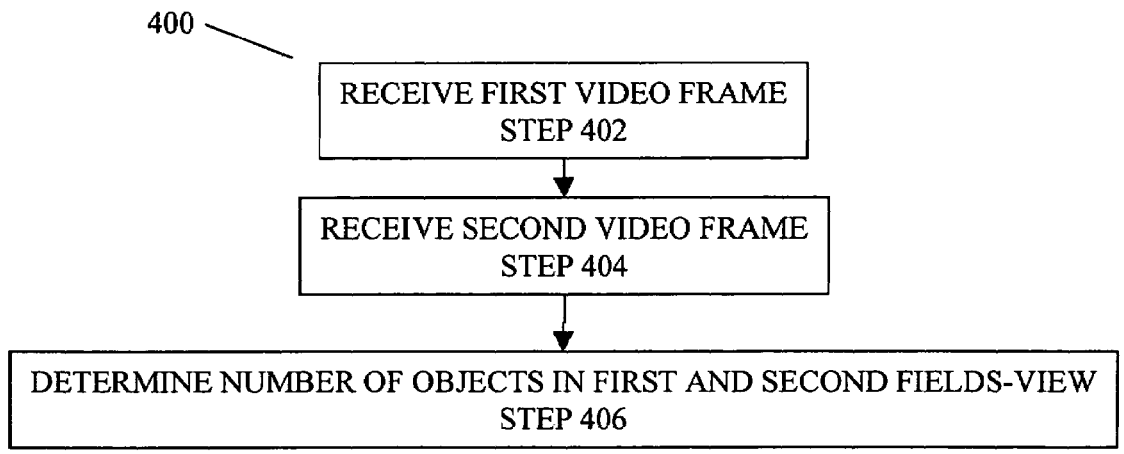
FIG. 4 is a flow chart of a method for determining the number of objects included in overlapping fields-of-view according to one embodiment of the invention.

FIG. 4 is a flow chart of a method 400 for determining the number of objects that are included within overlapping fields-of-view, (e.g., the fields-of-view 302 and 304) which may help reduce occurrences of counting a single object multiple times. The counting method is based on the analysis of video frames generated by image sources (e.g., the first and second cameras 102(1) and 102(2)) having overlapping fields-of-view (e.g, fields-of-view 302 and 304). The CAS computer 104 receives a first video frame from the image source (step 402) and receives a second video frame from the second image source (step 404). In one embodiment, the first video frame is received (step 402) from the first camera 102(1) into a memory module of an SVP 202(1) responsible for the first camera 102(1), and the second video frame is received from the second camera 102(2) into a memory module of an SVP 202(2) responsible for the second camera 102(2). In another embodiment, the video frames are received from their respective cameras 102(1) and 102(2) into a memory module of the MVP 204. In still another embodiment, the first video frame is received (step 402) from a video storage device (e.g., a VCR, or computer hard drive, optical drive, etc.) that is outputting video frames previously generated by the first camera 102(1) or another first camera, and the second video frame is received (step 404) from a video storage device that is outputting video frames previously generated by the second camera 102(2) or another second camera. The CAS computer 104 determines a number of objects that are included in first and second fields-of-view 302 and 304 without tracking any of the objects 308 (step 406). The determined number is based on the video frames and knowledge of how the fields-of-view 302 and 304 overlap.

Figure 5:
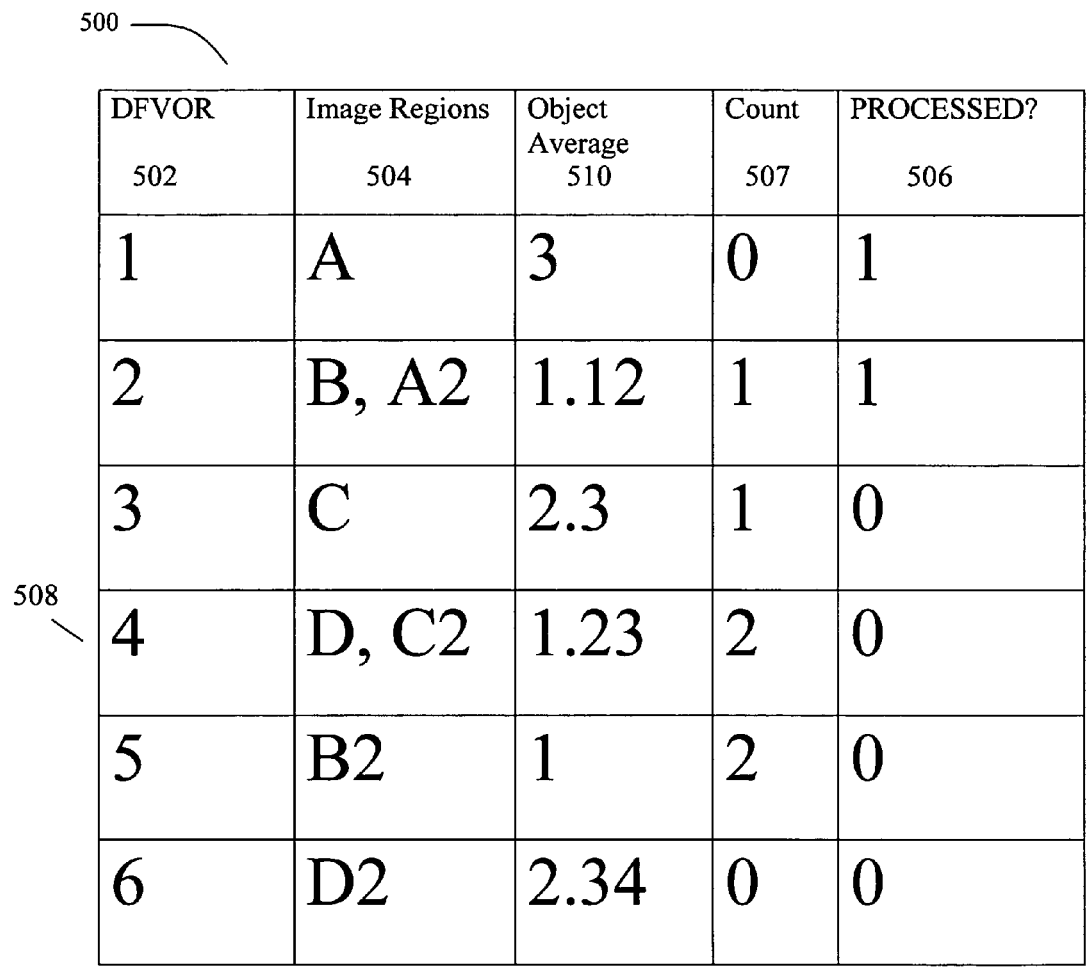
FIG. 5 is a schematic Distinct field-of-view region data structure according to one embodiment of the invention

FIG. 5 is an illustrative Distinct Field-of-View Region (DFOVR) data structure 500 maintained as part of one embodiment of the invention. The illustrative data structure 500 is in table format. In other embodiments, other data formats, including linked lists, arrays, data files, etc. may be employed to store the information. The portion(s) of the monitored environment 300 that are included within at least one camera field of view 302 or 304 are divided up into a plurality of DFOVRs 502. Each DFOVR 502 represents a distinct part of the monitored environment 300. The CAS computer 104 creates and maintains the data structure 500 that stores correspondences between analysis image regions 504 and DFOVRs 502. If two or more analysis image regions 504 overlap, the DFOVR data structure 500 indicates that those overlapping analysis image regions 504 correspond to the same DFOVR 502. For a non-overlapping analysis image region 504, the DFOVR data structure 500 indicates a one-to-one correspondence between the non-overlapping analysis image region 504 and its corresponding DFOVR 502. The DFOVR data structure 500 and its purpose can be better understood with reference to FIGS. 6A-15.

Figure 6A:
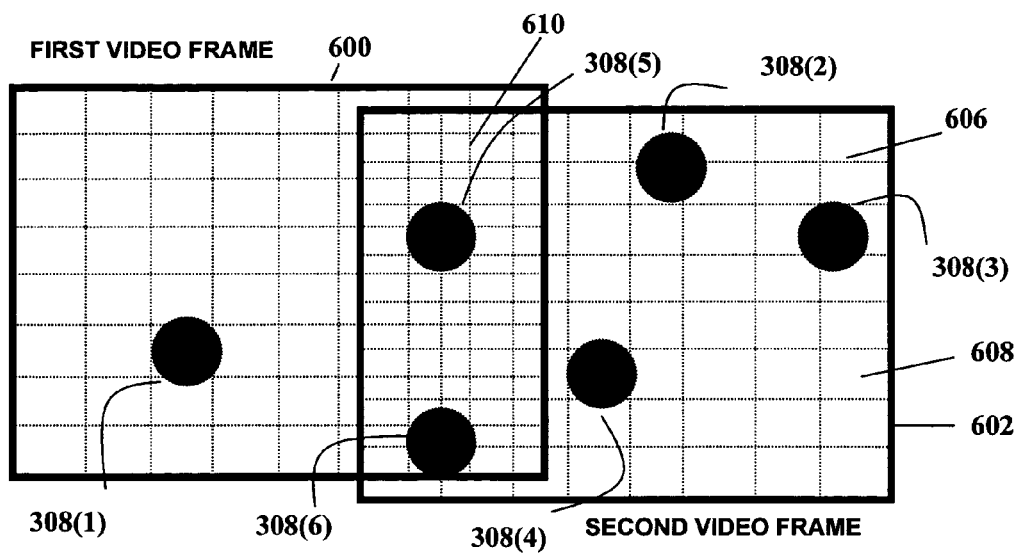
FIG. 6A is a schematic diagram of sample overlapping video frames.
Figure 6B:
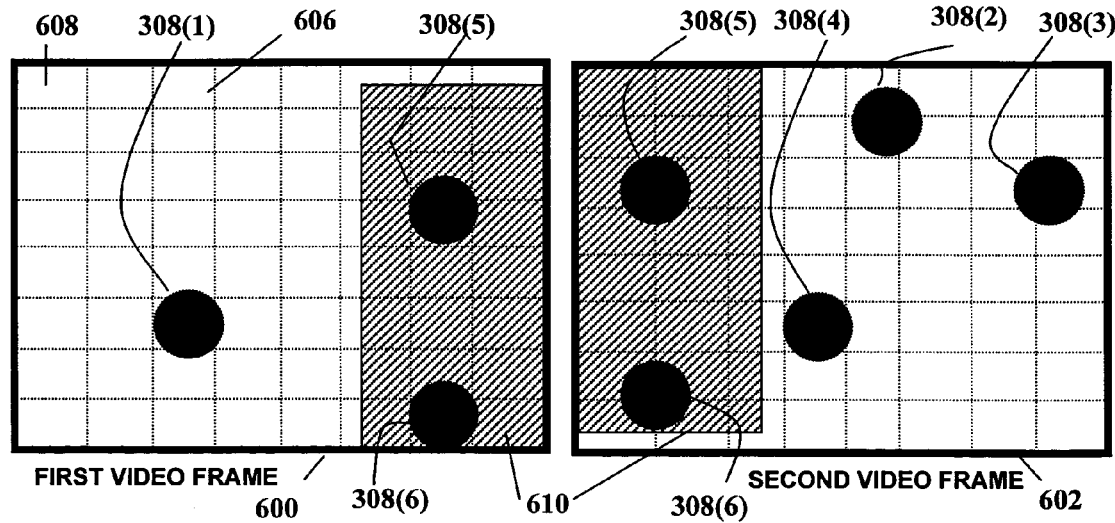
FIG. 6B is a schematic diagram of sample overlapping video frames as they appear individually.
Figure 6C:
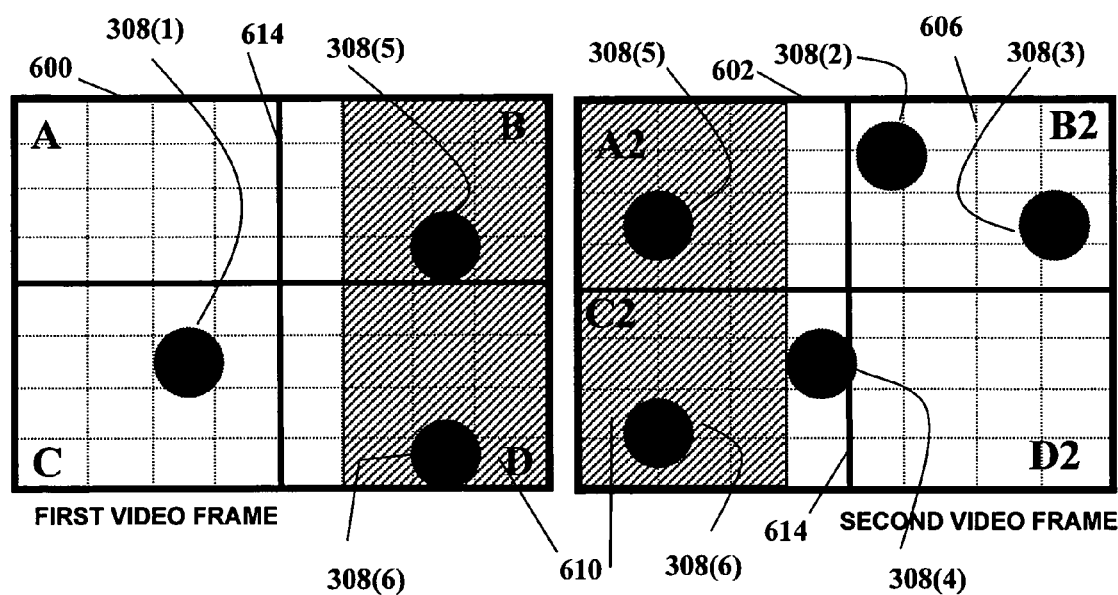
FIG. 6C s a schematic diagram of sample overlapping video frames divided into analysis image regions.

FIGS. 6A-6C are schematic depictions of the sample video frames 600 and 602 generated by the first and second cameras 102(1) and 102(2) monitoring the monitored environment 300. The video frames include a plurality of constituent image regions 608. The constituent image regions 608 are the smallest image regions for which the CAS computer 104 stores overlap data. FIG. 6A indicates how the fields-of-view 302 and 304 of the cameras 102(1) and 102(2) overlap. The dashed lines 606 superimposed on the first video frame 600 and the second video frame 602 illustrate the boundaries of constituent image regions 608. In this example, each video frame 600 and 602 is divided into sixty-four constituent image regions 608. In other embodiments, video frames 600 and 602 can be divided into a larger number or a smaller number of constituent image regions (e.g., 16 or 256). In addition, the first video frame 600 can be can be divided into a different number of constituent image regions than the second video frame 602. To reduce processing requirements the CAS computer 104 can group constituent image regions into analysis image regions.

FIG. 6B is a schematic depiction of the first video frame 600 and the second video frame 602 as each video frame 600 and 602 is analyzed by the CAS computer 104 in one embodiment of the invention. As in FIG. 6A, the dashed lines 606 illustrate the boundaries of the constituent image regions 608 of the video frames 600 and 602. The shaded region 610 is superimposed on the video frames 600 and 602, for illustrative purposes, to indicate the portion of each video frame 600 and 602 that overlaps with the other video frame 600 or 602.

The CAS computer 104 has knowledge of the overlap 610 depicted in the video frames 600 and 602 of FIG. 6B. In one embodiment, the CAS computer derives the knowledge of constituent image region 608 overlap using a method for determining corresponding image regions described in the U.S. patent application entitled "Computerized Method and Apparatus for Determining Field-of View Relationships Among Multiple Image Sensors," filed on Sep. 11, 2003, which is hereby incorporated herein in its entirety. The computerized method dynamically determines which constituent image regions correspond to one another by analyzing a series of video frames and calculating lift values and/or correlation coefficients between pairs of image regions. Constituent image regions are considered to be overlapping if the correlation coefficient and/or the lift value between the image regions surpass an overlap threshold. Such a method does not require any knowledge of the real-world relationship between fields-of-view.

In another embodiment image region overlap is programmed into the CAS computer on an image region-by-image region basis. In another embodiment, the overlap is programmed into the CAS computer on a pixel-by-pixel basis. The preprogramming can be achieved, for example by, using a paint program or by manually entering overlap data.

In embodiments that maintain pixel-by-pixel overlap information, the CAS computer 104 considers constituent image regions to overlap if the majority of pixels in the constituent image regions overlap. Similarly, the CAS computer 104 may consider an analysis image region 504 to be overlapping if the majority of its constituent image regions 608 are overlapping.

FIG. 6C schematically depicts the first video frame 600 and the second video frame 602. For illustrative purposes, the shaded region 612 indicates the constituent image regions 608 determined to be overlapping image regions based on the known overlap. For initial counting purposes, each video frame 600 and 602 has been divided into four analysis image regions 504, A, B, C, D, A2, B2, C2, and D2. The solid lines 614 superimposed on the video frames 600 and 602 indicate the boundaries of the analysis image regions 504. Each analysis image 504 region includes sixteen constituent image regions 608.

Figure 7:
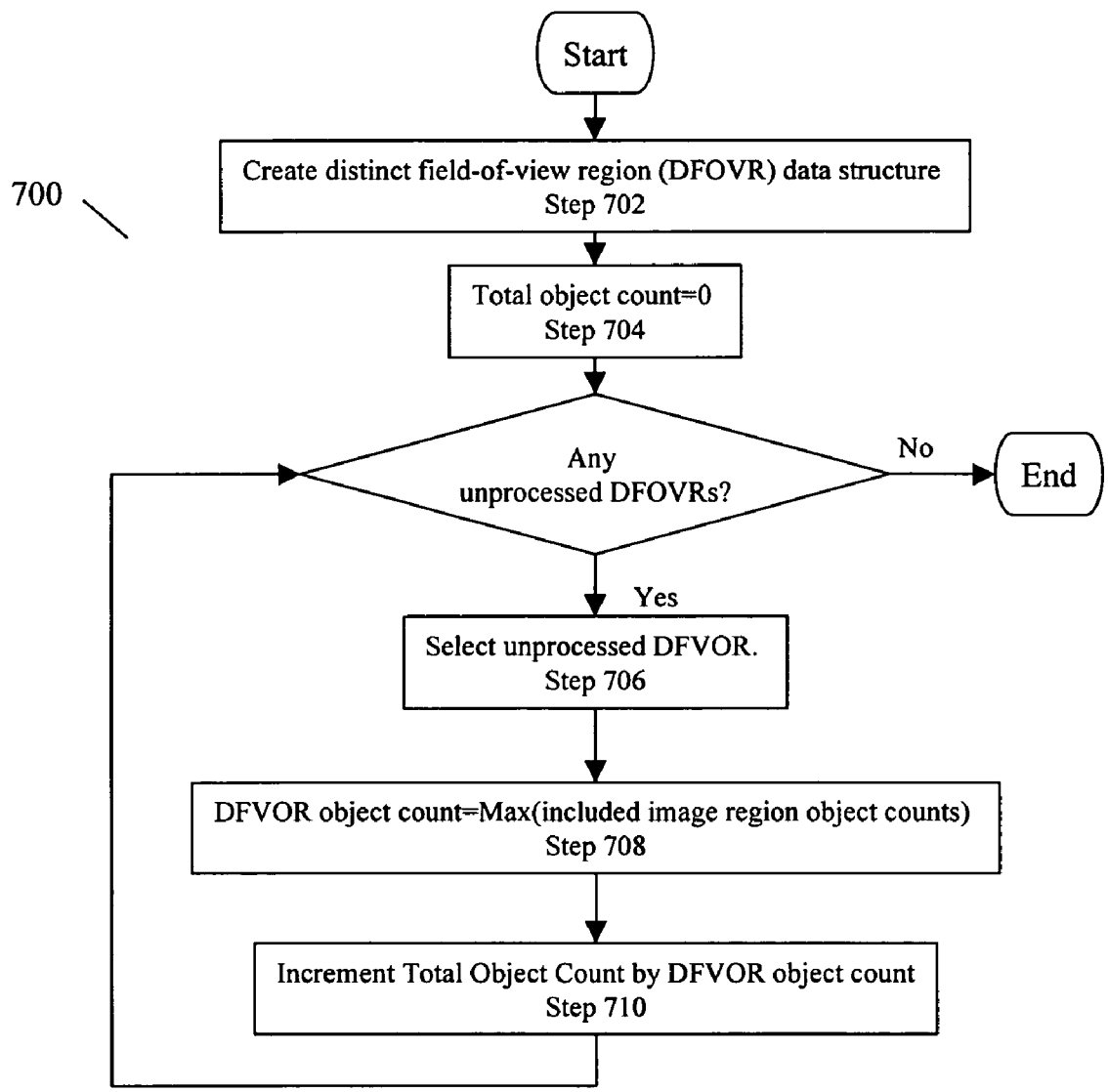
FIG. 7 is a more detailed flow chart of part of the method of FIG. 4.

FIG. 7 is flow chart illustrating, in more detail, one embodiment of a method 700 of counting the number of objects in the first and second fields-of-view 302 and 304. In the embodiment, the CAS computer 104 creates a DFOVR data structure 500 as described above (step 702). The video frames 600 and 602 are divided into DFOVRs 502. The DFOVRs 502 are entered into the DFOVR data structure 500 along with their corresponding analysis image regions 504.

Based on knowledge of the overlap 610 of the constituent image regions 608, analysis image regions B, D, A2, and C2 are considered to overlap. More specifically, analysis image region B overlaps with analysis image region A2, and analysis image region D overlaps with analysis image region C2. The number of DFOVRs 502 is equal to the number of non-overlapping analysis image regions 504 in addition to the number of sets of overlapping analysis image regions 504 (e.g., analysis image regions B and A2 make up one set of overlapping analysis image regions). Thus, the video frames 600 and 602 in FIG. 6C include six DFOVRs 502. The DFOVRs 502 and their corresponding analysis image regions 504 are stored in the illustrative DFOVR data structure 500.

The CAS 104 computer initializes a Total Object Count for the video frames 600 and 602 (step 704). The CAS computer 104 selects a DFOVR 502 that has not yet been processed (step 706). In one embodiment, the DFOVR data structure 500 includes a binary variable PROCESSED? 506 that equals 0 before a DFOVR 502 has been processed, and that is set to 1 after processing. The CAS computer 102 selects a DFOVR 502 by choosing a DFOVR 502 from the DFOVR data structure 500 whose PROCESSED? variable 506 is equal to 0.

The CAS computer 104 calculates the number of objects that are included within the DFOVR 502 ("the DFOVR object count 507") (step 708). The CAS computer 104 counts the number of objects 308 included in each analysis image region 504 that corresponds to the DFOVR 502. In one embodiment, the DFOVR 502 sets the DFOVR object count 507 to equal the number of objects 308 included in the corresponding analysis image region 504 that includes the most objects 308. For example, in analyzing DFOVR #4 508, corresponding to analysis image regions D and C2, the CAS computer 104 would determine that analysis image region D includes one object 308(6) and that analysis image region C2 includes two objects 308(4) and 308(6). The CAS computer 104 would therefore set the DFOVR object count 507 for DFOVR #4 508 to 2, as indicated in the DFOVR data structure 500. In another embodiment, the DFOVR object count 507 is set to the average of the numbers of objects 308 included in the corresponding analysis image regions 504. The Total Object Count for the video frames 600 and 602 is incremented by the DFOVR object count 507 (step 710) and the PROCESSED? variable 506 for the DFOVR 502 is set to 1.

The CAS computer 104 repeats the DFOVR counting process (steps 706-710) until all DFOVRs 502 have been processed. The Total Object Count after all DFOVRs 502 have been processed is the determined number of objects 308 in the first and second fields of view 302 and 304.

The method 700 of determining a number of objects 308 in first and second fields of view 302 and 304 from a single set of video frames 600 and 602 can suffer from reduced precision if the CAS computer 104 analyzes the single set of video frames 600 and 602 using analysis image regions 504 that are so large that the number of objects 308 included in the analysis image regions 504 corresponding to a single DFOVR 502 frequently differ. In order to improve precision, in one embodiment, the CAS computer 104 analyzes a plurality of video frames generated by each camera 102 monitoring the monitored environment 300. Such analysis allows for a determination of analysis image region sizes that produce a more accurate number.

Figure 8:
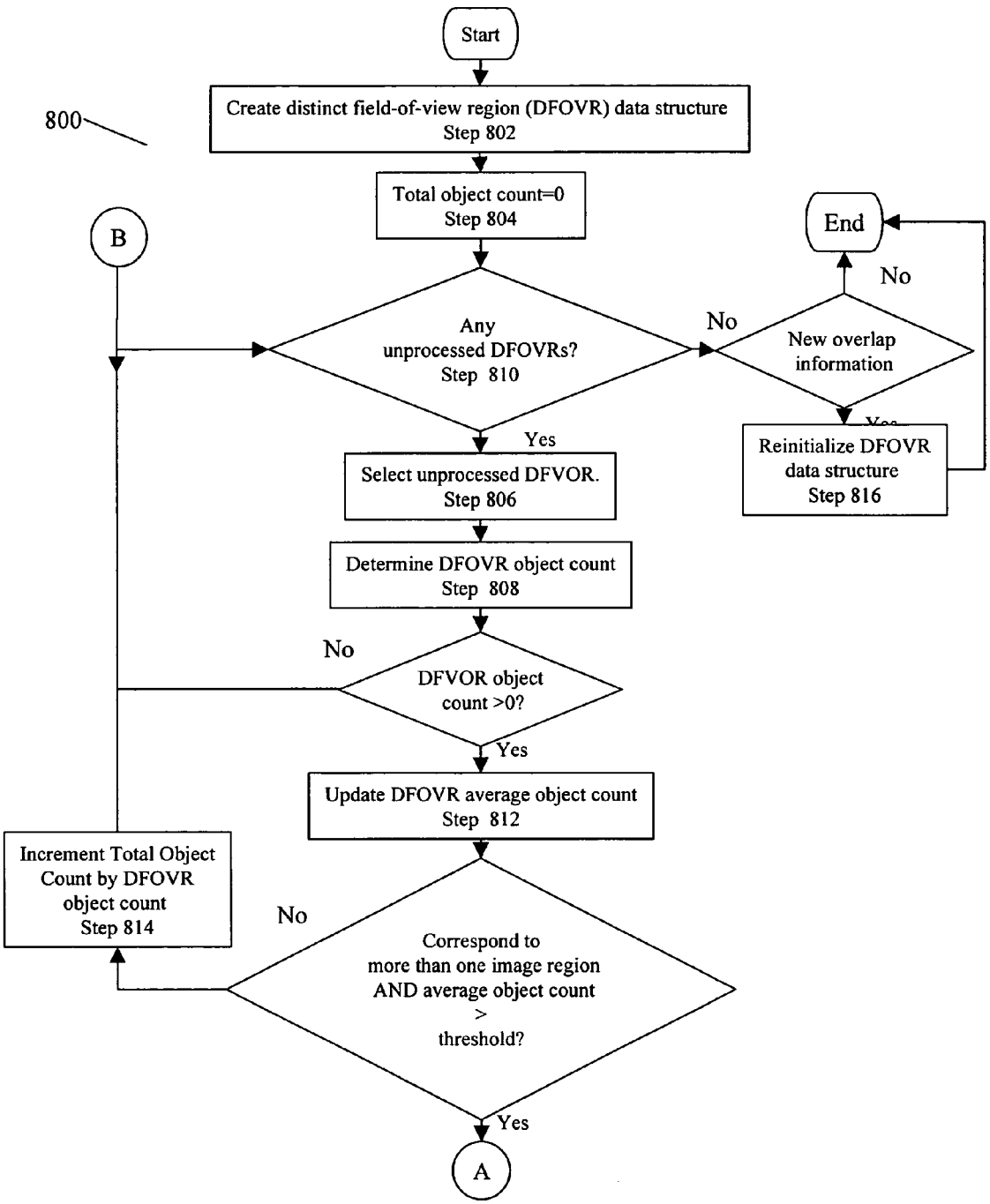
FIG. 8 is a flow chart illustrating another method of counting a number of objects in overlapping fields-of-view according to one embodiment of the invention.

FIG. 8 is a flow chart of a method 800 of counting objects 308 in first and second overlapping fields of view 302 and 304 at one period in time based on analyzing a plurality of video frames generated by the first and second cameras 102(1) and 102(2). For illustrative purposes, the method 800 will be described in relation to the same illustrative video frames 600 and 602 described above.

The method 800 begins much in the same way as the method 700. The CAS computer 104 creates a DFOVR data structure 500 (step 802). The DFOVR data structure 500 can have the same form as the DFOVR data structure 500 described with respect to method 700. The Total Object Count for the instant in time is set to zero (step 804) and a first unprocessed DFOVR 502 is selected from the DFOVR data structure 500 (step 806).

The CAS computer 104 determines a DFOVR object count 507 for the DFOVR 502 (step 808). In one embodiment, the CAS computer counts the number of objects in each analysis image region that corresponds to the DFOVR. The CAS computer then sets the DFOVR object count 507 to equal to the largest of the corresponding analysis image region object counts. In another embodiment, the DFOVR object count 507 is equal to the average of the number of objects 308 included in the analysis image regions 504 corresponding to the DFOVR 502. If the DFOVR object count 507 is determined to be 0, the CAS computer 104 sets the DFOVR PROCESSED? variable 506 to 1 and consults the DFOVR data structure 500 to determine if any DFOVRs 502 remain to be processed (step 810).

In contrast to method 700, in the method 800, the CAS computer 104 maintains an additional variable related to each DFOVR 502. The DFOVR data structure 500 maintains an average of the non-zero DFOVR object counts 507 the CAS computer 104 has determined for the DFOVR 502 over a plurality of sets of video frames (i.e., the DFOVR object average 510). During processing of a DFOVR 502, if the CAS computer 102 determines that the DFOVR object count 507 is greater than zero, the CAS computer 104 updates the DFOVR object average 510 (step 812). If such DFOVR 502 corresponds to only a single analysis image region 504 and/or the DFOVR object average 510 is less than a predetermined threshold, the CAS computer 104 increments the Total Object Count for the time instant (step 814), sets the DFOVR PROCESSED? variable 506 to 1, and consults the DFOVR data structure 500 to determine if any DFOVRs 502 remain to be processed (step 810). In one embodiment the threshold is between 1 and about 1.5. In another embodiment, the threshold is between 1 and about 2.

Figure 9:
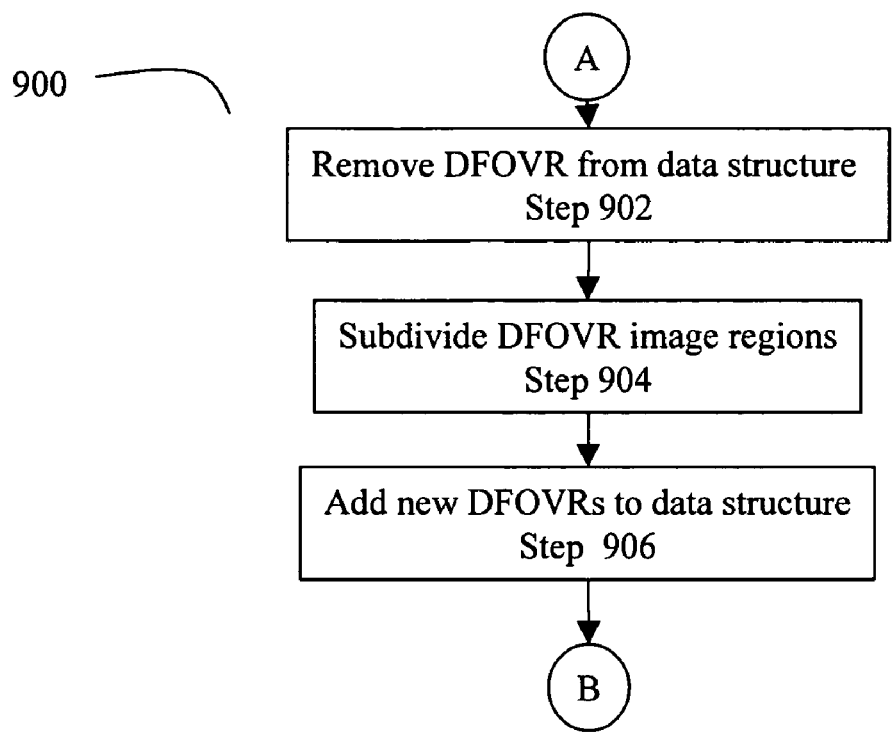
FIG. 9 is a flow chart of a method of subdividing analysis image regions according to one embodiment of the invention.

FIG. 9 is a continuation of the flow chart of FIG. 8, indicating the steps 900 taken by the CAS computer 104 if a DFOVR 502 is determined to include at least one object, corresponds to more than one analysis image region 504, and the DFOVR object average 510 for the DFOVR 502 is greater than the threshold. Therefore, the CAS computer 104 removes the DFOVR 502 from the DFOVR data structure 500 (step 902) and divides the analysis image regions 504 that corresponded to the DFOVR 502 into smaller groups of constituent image regions 608 (e.g., four constituent image regions instead of the original sixteen) (step 904). The CAS computer 104 determines new DFOVRs 502 for the subdivided analysis image regions 504. Each new DFOVR 502 is added to the DFOVR data structure 500 identifying its corresponding new analysis image regions 504 (step 906) with its PROCESSED 506 variable set to zero.

Figure 10:
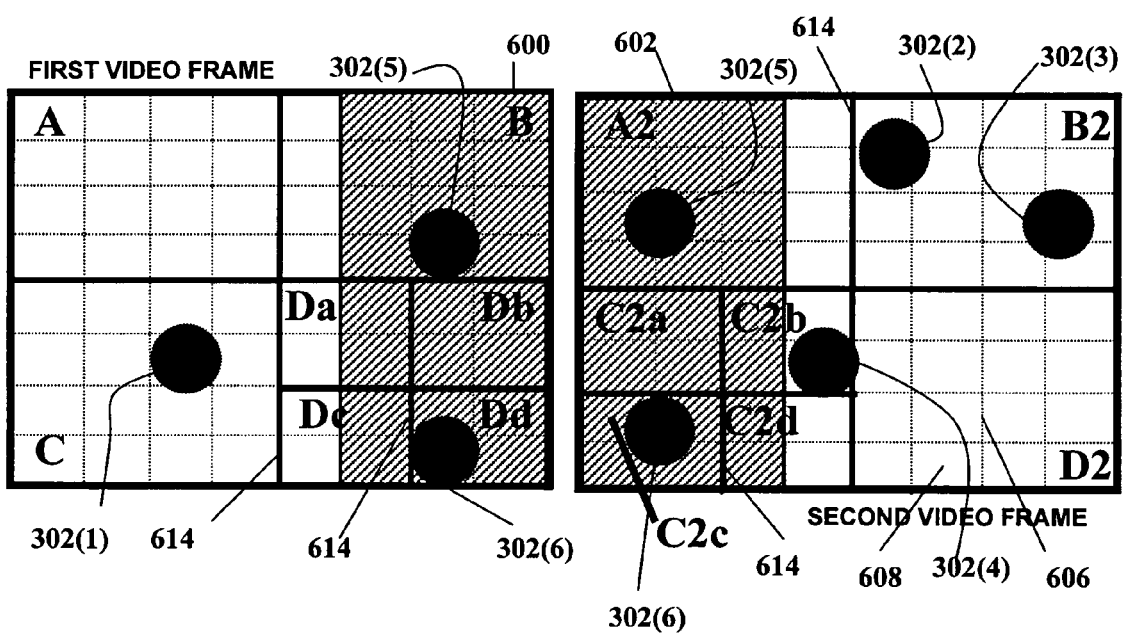
FIG. 10 is a schematic diagram of sample overlapping video frames divided into analysis image regions.

FIG. 10 is a schematic depiction of the first and second video frames 600 and 602 after DFOVR #4 508 has been subdivided. As before, the dashed lines 606 overlaid on the video frames indicate constituent image region 608 boundaries. The solid lines 614 overlaid on the video frames indicate the boundaries of the analysis image regions 504 after the subdivision. Analysis image region D has been divided into four smaller analysis image regions Da, Db, Dc, and Dd. Analysis image region C2 has been divided into analysis image regions C2a, C2b, C2c, C2d. Based on the knowledge of overlap of the constituent image regions 608, the CAS computer 104 determines that analysis image regions Db and Dd overlap with analysis image regions C2a and C2c, respectively. As consideration of an analysis image region 504 to be overlapping requires a majority of the constituent image regions 608 to overlap, and analysis image regions Da, Dc, C2b, and C2d have an equal number of overlapping and non-overlapping constituent image regions 608, analysis image regions Da, Dc, C2a, and C2b are not considered to be overlapping. Instead the analysis image regions are their own DFOVRs 502. Therefore, the video frames 600 and 602 now include 11 DFOVRs 502.

FIG. 11 is a schematic depiction of the contents of the DFOVR data structure 500 after the analysis image regions 504 corresponding to DFOVR #4 508 are subdivided. After the new DFOVRs 502 are added to the DFOVR data structure 500, the CAS computer 104 selects an unprocessed DFOVR 502 (step 806) from the DFOVR data structure 500 for analysis. After all DFOVRs 502 have been processed, the CAS computer 104 considers the resulting Total Object Count to be the number of objects 308 in the analyzed fields-of-view 302 and 304, and the CAS computer 104 waits to analyze the next set of video frames. The precision of the count can be further improved by setting the Total Object Count equal to an average of the Total Object Counts calculated for a number of sequential video frames.

As mentioned above, in one embodiment, the CAS computer 104 bases its overlap information on a dynamic field-of-view correspondence determination. In embodiments using such overlap determination methods, the CAS computer 104 may determine new overlap information. If new overlap data is determined between the analysis of sets of video frames, the DFOVR data structure 500 is reinitialized to incorporate the new overlap information. The CAS computer determines new analysis image region overlaps 610 and new DFOVRs 502 with corresponding analysis image regions 504, and stores the information in the reinitialized DFOVR data structure 500 (step 816).

Monitoring systems usually do not observe closed environments. For example in retail stores, customers enter and leave the store throughout the day. Entrance and exit points are referred to herein as environment gateways. Monitored environments often also include regions that are not monitored by cameras, (i.e. off-camera regions). For example, store managers may not want to monitor restrooms based privacy concerns, or, to conserve resources, they may want to only monitor important regions within a store (e.g., entrances, exits, high-value merchandise displays, points-of-sale, etc.). One object of the invention is to maintain statistically useful counts of objects within a monitored environment that includes an environment gateway and off-camera regions. Generally, the number of objects included within a monitored environment is equal to the sum of the number of objects within all fields-of-view included in the monitored environment and the number of objects located within the off-camera regions of the monitored environment.

Figure 12:
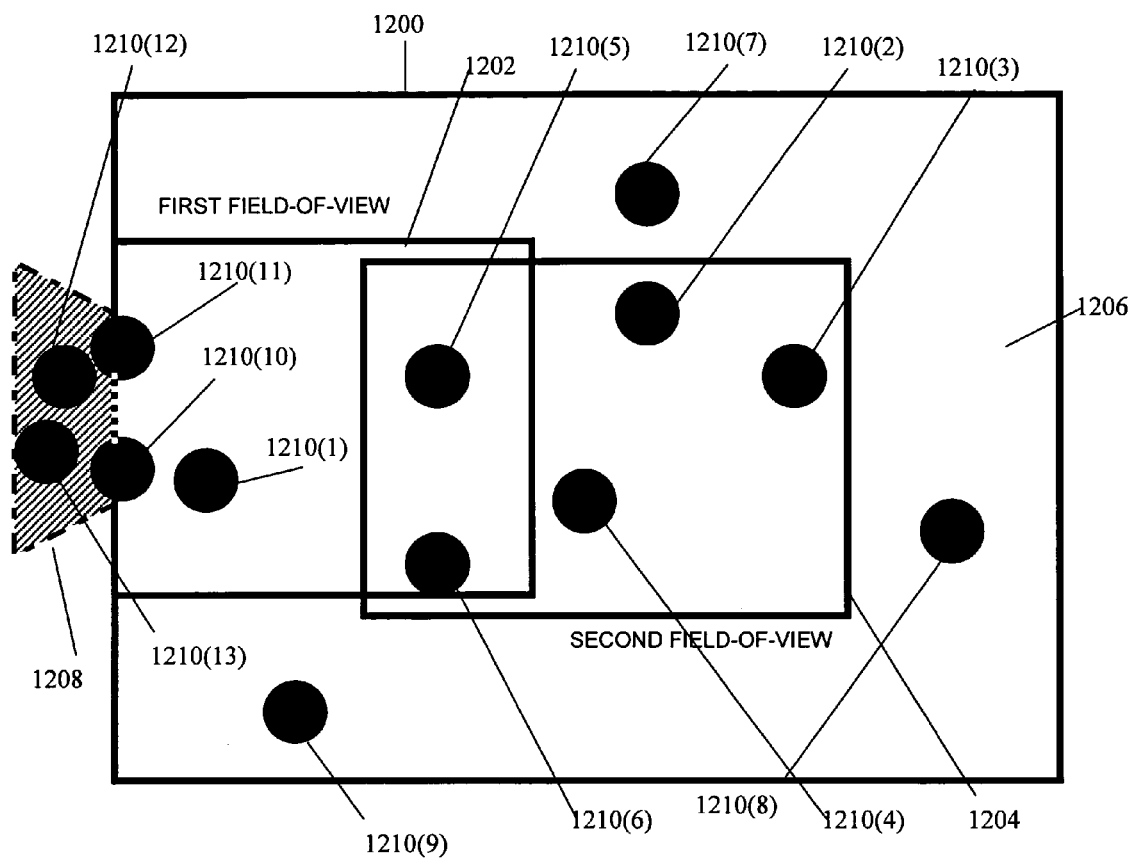
FIG. 12 is a schematic depiction of a second monitored environment.

FIG. 12 is a schematic illustration of a second monitored environment 1200 that includes two fields-of-view 1202 and 1204, an off-camera region 1206 and an environment gateway 1208 included within the first field-of-view 1202. Objects 1210(1)-1210(13) (collectively 1210) are included within both fields-of-view 1202 and 1204 and within the off-camera region 1206. Some objects 1210(12) and 1210(13) are included completely within the environment gateway 1208, and other objects 1210(10) and 1210(11) are only partially within the environment gateway 1208.

Figure 13:
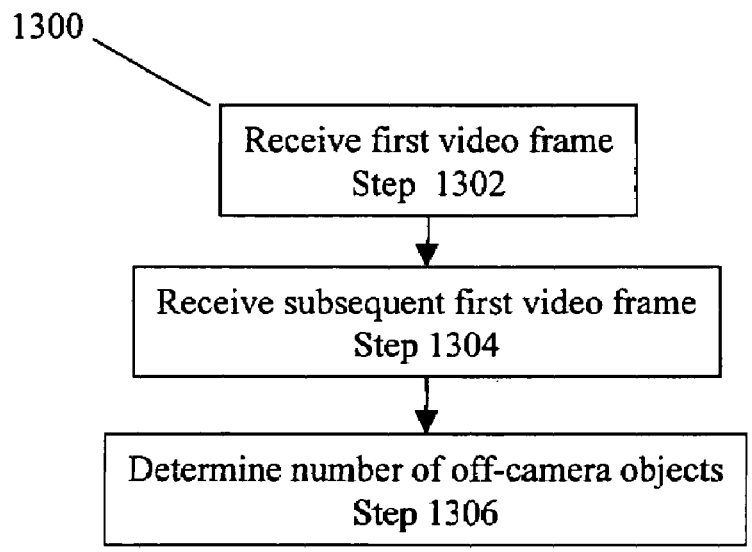
FIG. 13 is a flow chart of a method of determining a number of objects located in an off-camera region of a monitored environment according to one embodiment of the invention.

FIG. 13 is a flow chart of a method 1300 of determining a number of objects 1210 located in the off-camera region 1206 of the monitored environment 1200. The method 1300 can also be applied to a monitored environment 1200 that only has one field of view or more than two fields of view. The fields-of-view 1202 and 1204 of the monitored environment 1200 overlap. The method 1300 can also be applied to monitored environments with non-overlapping fields-of-view. For illustrative purposes, it will be assumed that the monitored environment being monitored is the monitored environment 1200. The CAS computer 104 receives a first set of video frames generated by first and second cameras 102(1) and 102(2)(step 1302). The CAS computer 104 receives a subsequent set of video frames generated by the cameras 102(1) and 102(2) (step 1304). As with the method 400, the video frames can be received into memory modules of SVPs 202 or the MVP 204, and the frames can be received from either cameras 102 or intermediate video storage devices. The CAS computer 104 determines a number of off-camera objects based on the sets of video frames (step 1306).

Figure 14:
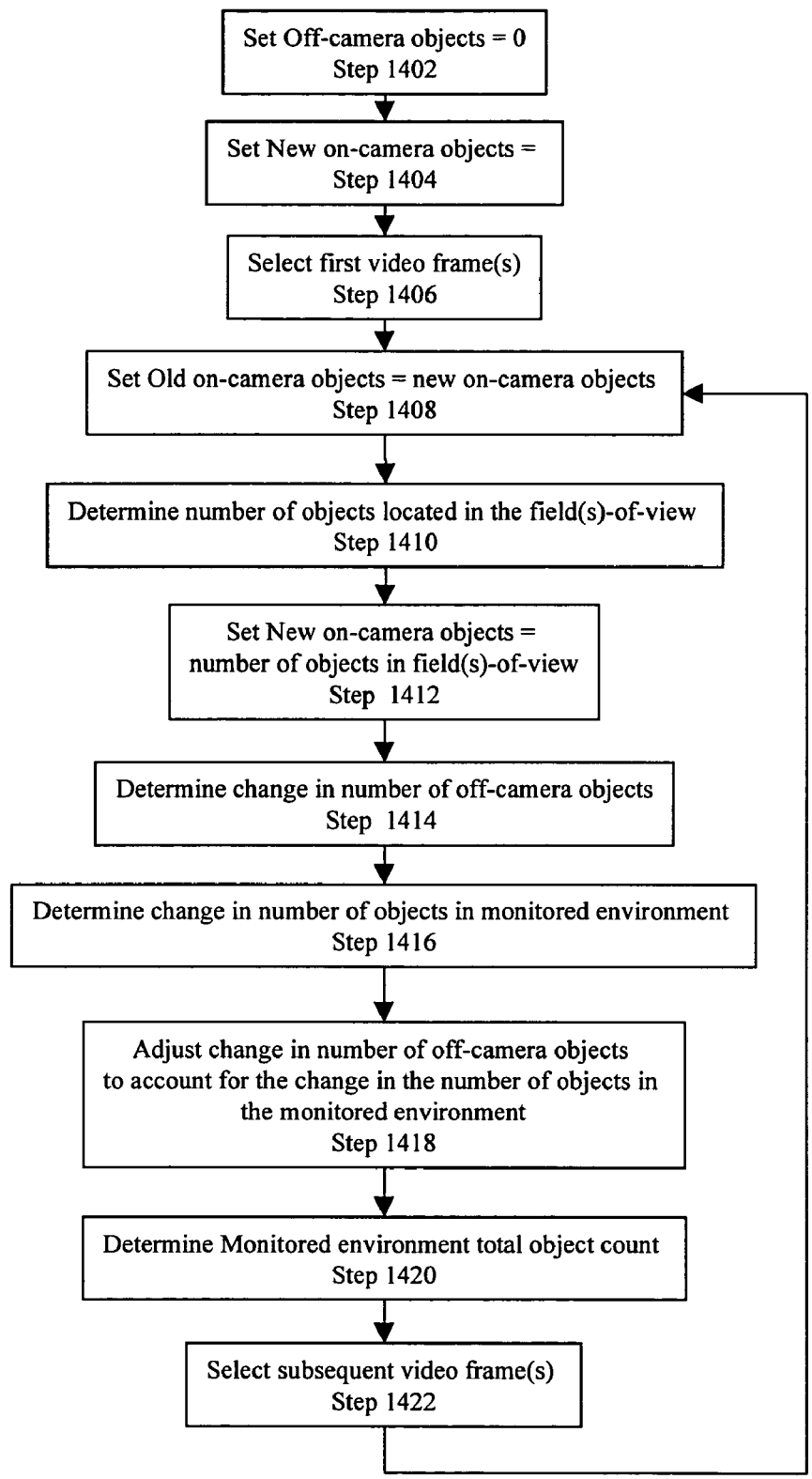
FIG. 14 is a more detailed flow chart of part of the method of FIG. 13.

FIG. 14 is a flow chart of one step of determining the number of off-camera objects (step 1306), according to one embodiment of the invention. The more detailed flow chart also provides for a method of determining a number of objects 1210 in a monitored environment and a change in a number of objects 1210 included in a monitored environment 1200.

In one embodiment, the CAS computer 104 utilizes several variables including Off-camera objects, New on-camera objects, Old on-camera objects, and Monitored environment total count. The Off-camera count and New on-camera count are initialized to zero (steps 1402 and 1404, respectively). The CAS computer 104 selects the first set of received video frames (step 1406). The CAS computer 104 sets Old on-camera objects to equal the New on-camera objects (step 1408).

The CAS computer 104 determines the number of objects 1210 located within the fields of view 1202 and 1204 in the monitored environment 1200 based on the set of video frames (step 1410). In one embodiment, the CAS computer 104 uses the method depicted in FIG. 8 to determine the number of objects located in each DFOVR of the received video frames. The CAS computer uses the methods 400 and 700 or 800 described above to divide the video frames into a number of DFOVRs in order to reduce occurrences of counting objects 1210 repeatedly. If the monitored environment 1200 were monitored by only one camera 102, or by multiple cameras 102 having non-overlapping fields-of view, each video frame could be considered a single DFOVR. The CAS computer 104 sets New on-camera objects equal to the determined number of objects 1210 located in the DFOVRs (step 1412).

In one embodiment, the CAS computer 104 calculates an initial change in the number of Off-camera objects (step 1414) by subtracting New on-camera objects from Old on-camera objects. The calculation is based on net changes in object 1210 counts and not based on determining whether any particular object 1210 left a field of view 1202 or 1204.

In general, objects 1210 that are no longer within the field-of-view 1202 or 1204 of a camera 102 within the monitored environment 1200 could either have moved into the off-camera region 1206, or the object 1210 could have left the monitored environment 1200. In addition, between sets of subsequent video frames, additional objects 1210 may have entered the monitored environment 1200. Therefore, to refine the determination of the change in Off-camera objects (step 1414), the CAS computer determines a change in the number of objects within the monitored environment (step 1416). By definition, objects 1210 can only enter or leave a monitored environment 1200 through an environment gateway 1208. If the monitored environment lacked an environment gateway 1208, this step could be skipped.

Environment gateways 1208 can be classified into three categories, entrances, exits, and entrance-exits. Entrances only allow objects to enter a monitored environment 1200. Exits only allow objects to exit a monitored environment 1200, and entrance-exits allow for both entry to and exit from a monitored environment 1200.

In one embodiment, a CAS system 100 operator or installer identifies environment gateways 1208 to the CAS computer 104. In one embodiment, environment gateways 1208 are identified using a paint program where the operator or installer, viewing a video frame generated by a camera 102 within the monitored environment 1200, paints a group of pixels to identify the environment gateway. For example, the operator paints the pixels that can be seen through environment gateway 1208 (i.e. pixels depicting the outside world). An example of such painting is illustrated by the shading of the environment gateway 1208. In the illustrative embodiment, pixels that depict the floor in front of the door, inside the monitored environment, would not be identified as part of the environment gateway. Objects 1210(12) and 1210(13) are included completely within the environment gateway, whereas objects 1210(10) and 1210(11) are only partially included in the environment gateway 1208. The objects 1210(10) and 1210(11) overlap the environment gateway 1208.

Figure 15A:
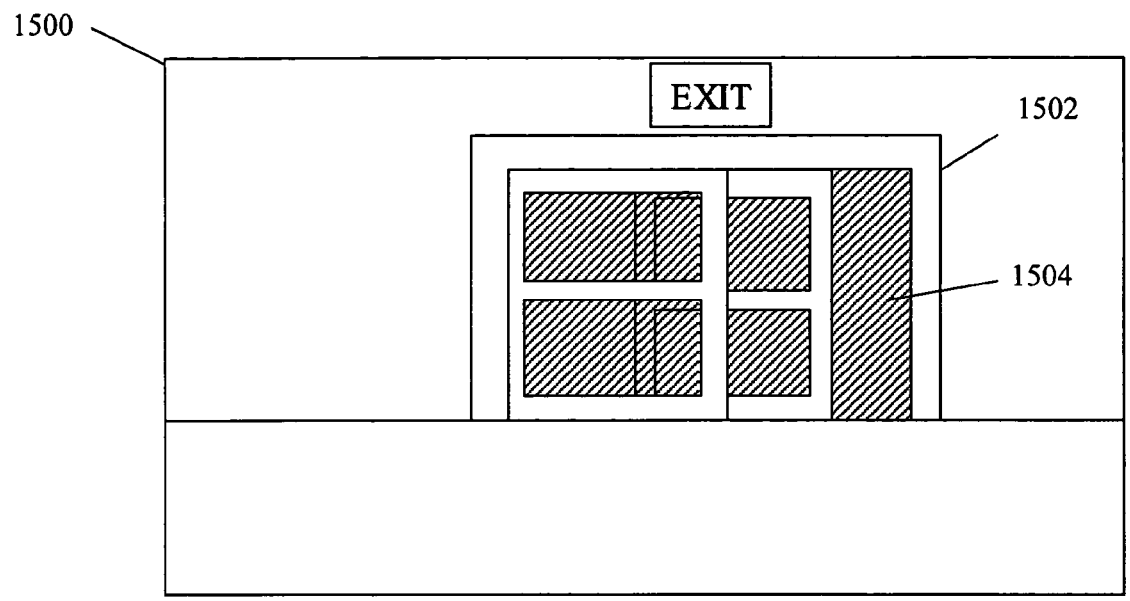
FIG. 15 is a schematic depiction of an illustrative field of view that includes an environment gateway.
Figure 15B:
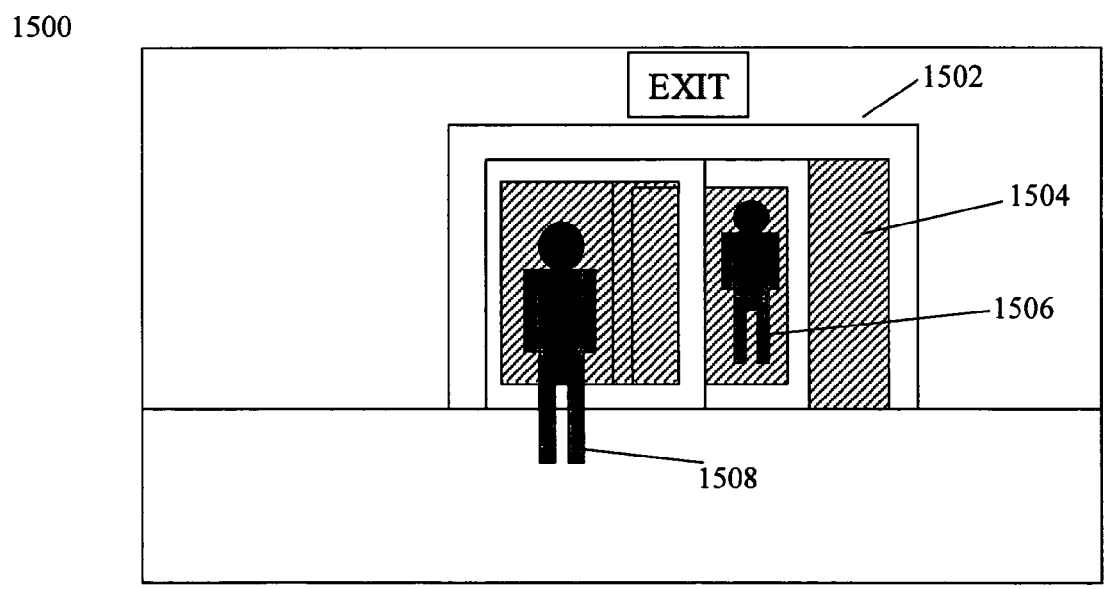

FIGS. 15A and 15B are examples of a field-of-view 1500 that includes an exit 1502 having glass doors. The area within the exit 1502 is shaded, indicating what a CAS computer 104 monitoring this field-of-view 1500 considers to be an environment gateway 1504 according to one embodiment of the invention. FIG. 15B includes two objects 1506 and 1508. The first object 1506, visible beyond the exit 1502, through the glass doors, is included completely within the environment gateway 1504. In contrast, the second object 1508 is only partially within the shaded area, and thus only partially within the environment gateway 1504.

Figure 16:
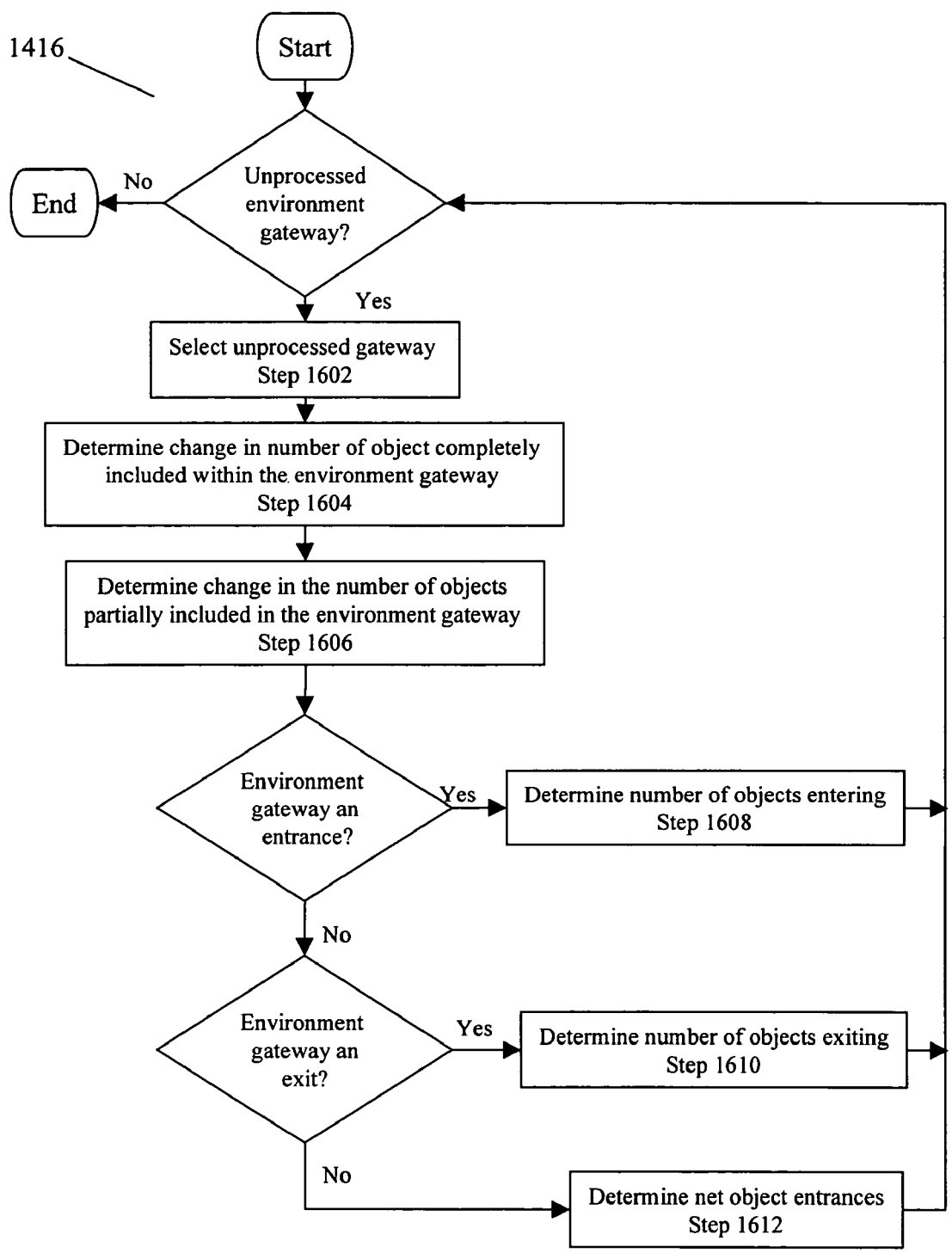
FIG. 16 is a flow chart of a method of determining a change in the number of objects that are included in a monitored environment.

FIG. 16 is a flow chart of a method (step 1416) of determining a change in the number of objects 1210 included in a monitored environment 1200. It is assumed that the CAS computer 104 has received first and subsequent sets of video frames (steps 1302 and 1304) that include at least one environment gateway 1208. The CAS computer selects a first environment gateway 1208 included in the monitored environment 1200 (step 1602). Comparing the first and subsequent set of video frames, the CAS computer calculates a change in the number of objects 1208 that are completely included within the environment gateway 1208 (e.g., 1210(12) and 1210(13)), Δdoor (step 1604). An object is completely within an environment gateway 1208 if all pixels that make up the object are included within the environment gateway 1208. In one embodiment objects that are completely within the environment gateway 1208 are considered to be outside of the monitored environment 1200. The CAS computer 104 calculates the change in the number of objects that are partially included in the environment gateway 1208 (e.g., 1210(10) and 1210(11)), Δoverlapping (step 1606). In one embodiment, objects that overlap an environment gateway 1208 are inside of a monitored environment 1200, in front of the environment gateway.

If the environment gateway 1208 is an entrance, the CAS computer 104 calculates the number of objects 1210 entering the monitored environment 1208 (step 1608) through the entrance as follows:

$$\#Entered = \max(\Delta door, 0) \tag{1}$$

As an object 1210 cannot leave through an entrance, it is assumed that objects 1210 completely within an entrance must have come from outside the monitored environment 1200. Similarly, as it is assumed that no objects 1210 can enter a monitored environment 1200 through an exit, any decrease in the number of objects 1210 included entirely within an exit is assumed to be the result of an object 1210 exiting the monitored environment 1200. If the environment gateway 1208 is an exit, therefore, the CAS computer 104 calculates the number of objects that exited the monitored environment 1208 (step 1610) as follows:

$$\#exited = \max(-\Delta door, 0) \tag{2}$$

If the environment gateway is an entrance-exit, and Δ is nonzero, changes in the number of objects 1210 being included completely within the environment gateway 1208 can be the result of either a recently entered object 1210 moving into the rest of the monitored environment 1200, or a recently exiting object 1210 moving away into the rest of the outside world. The CAS computer 104 takes into account the change in the number of objects 1210 that overlapped the doorway. The CAS computer 104 determines the number of objects that entered and exited the monitored environment 1200 (step 1512) as follows:

if Δdoor>0, #entered=Δdoor+max(−Δdoor,min (Δoverlapping, 0));

if Δdoor<0, #exited=−Δdoor−min(−Δdoor,max (Δoverlapping,0)). (3)

The determination is prone to occasional error. However, an erroneous determination of an entry is equally as likely as an erroneous determination of an exit. Over time, therefore, the errors will likely cancel each other out. After processing an environment gateway 1208, the CAS computer 104 determines if any other environment gateways 1208 need to be processed.

Referring back to FIG. 14, after the CAS computer determines a change in the number of objects in the monitored environment (step 1416), the CAS computer adjusts the previously determined change in off-camera objects (step 1418), in one embodiment, by summing Off-camera object change with the monitored environment object change.

The CAS then adds the Off-camera objects change to Off-camera objects to determine an updated Off-camera objects. The CAS computer determines the Monitored environment total object count by adding the New on-camera count with the updated Off-camera objects count (step 1420). The CAS computer 104 is then ready to analyze the next set of received video frames (1422). As with the field-of-view object counting method 800, precision can be enhanced by averaging the Off camera objects count and the Monitored environment total object counts over a series of several sets of video frames.

The data generated through the methods described above can be utilized to determine a number of useful statistics. In the case that monitored environment 1200 is a retail store, the Monitored environment total object counts can be used to determine when the store is busiest. For stores with multiple environment gateways, the #entered and #exited values can be used to determine which exits and entrances are the busiest at different times of the day. In combination with POS data, the measurements can be utilized to estimate the fraction of customers who make purchases. Individual or groups of video frames can be analyzed to determine high traffic areas within the store. As none of this analysis requires real-time computation, proprietors of a monitored environment 1200 can record video of the environment 1200 and later have the recordings analyzed without having to invest in their own CAS computer 104.

What is claimed is:

1. A computerized method of video analysis comprising:
   a) receiving a plurality of first video frames, the first video frames being generated over a period time by a first image source having a first field of view;
   b) receiving a plurality of second video frames, the second video frames being generated over a period of time by a second image source having a second field of view, the second field of view having a known overlap with at least part of the first field-of-view; and
   c) sub-dividing the first and second fields-of-view into two or more image regions:
   d) classifying each of the image regions in the first field-of-view overlapping with image regions in the second field of view as an overlapping image region, classifying each of the image regions in the second field-of-view overlapping with image regions in the first field of view as an overlapping image region, and classifying the remainder of the image regions as non-overlapping image regions: and
   (e) determining a number of objects, without tracking each of the objects, in the first and second fields-of-view wherein the number of objects equals the sum of the number of objects included in each non-overlapping image region and the maximum number of objects among each of the overlapping image regions.

2. The computerized method of video analysis of claim 1 further comprising maintaining a data structure identifying the image regions as either overlapping or non-overlapping.

3. The computerized method of claim 2 further comprising: receiving updated overlap information; and altering data in the data structure identifying image regions that correspond to overlapping or non-overlapping image regions based on the updated overlap information.

4. The computerized method of claim 1 further comprising averaging the number of objects included in the first and second fields-of-view over at least two instants in time.

5. A computerized system for video analysis comprising:
   a) a receiving module configured to receive a plurality of first video frames, the first video frames being generated over a period time by a first image source having a first field-of-view and to receive a plurality of second video frames, the second video frames being generated over a period of time by a second image source having a second field-of-view, the second field of view having a known overlap with at least part of the first field-of-view; and
   b) a processing module configured to (i) sub-divide the first and second fields-of-view into two or more image regions, (ii) classify each of the image regions in the first field-of-view overlapping with image regions in the second field of view as an overlapping image region, (iii) classify each of the image regions in the second field-of-view overlapping with image regions in the first field of view as an overlapping image region, (iv) classify the remainder of the image regions as non-overlapping image regions: and (v) determine a number of objects, without tracking the objects, wherein the number of objects equals the sum of the number of objects included in each non-overlapping image region and the maximum number of objects among each of the overlapping image regions.

6. The computerized system for video analysis of claim 5 wherein, the processing module is further configured to maintain a data structure identifying the image regions classified as either overlapping or non-overlapping.

7. The computerized system for claim 6, wherein the processing module is further configured to receive updated overlap information, and to alter data in the data structure overlapping or non-overlapping image regions based on the updated overlap information.

8. The computerized system for claim 5 wherein the processing module is further configured to average the number of objects included in the first and second fields-of-view over at least two instants in time.

* * * * *